Aug. 12, 1924.
G. W. HOLMES
1,504,474
BOLL WEEVIL GATHERER AND DESTROYER
Filed Oct. 23, 1922    2 Sheets-Sheet 1
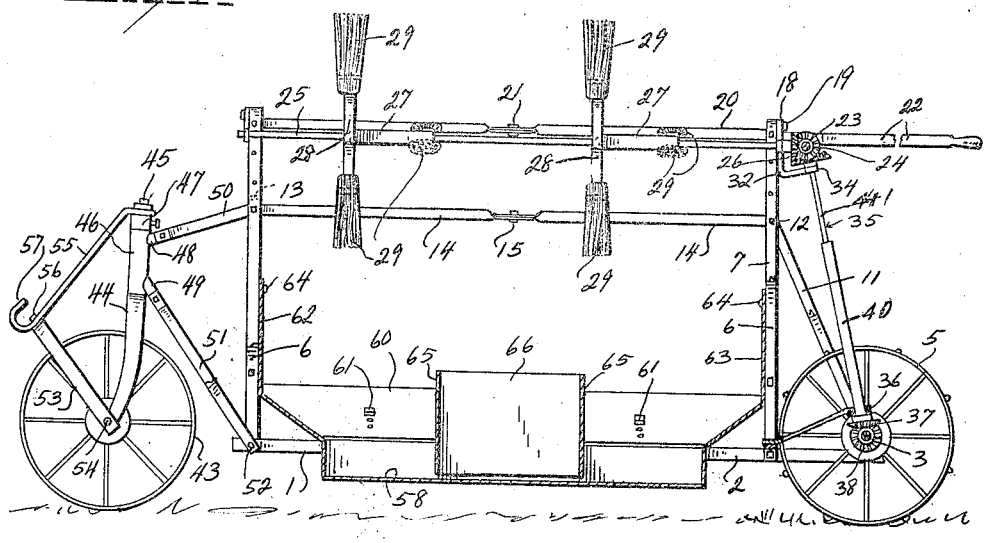
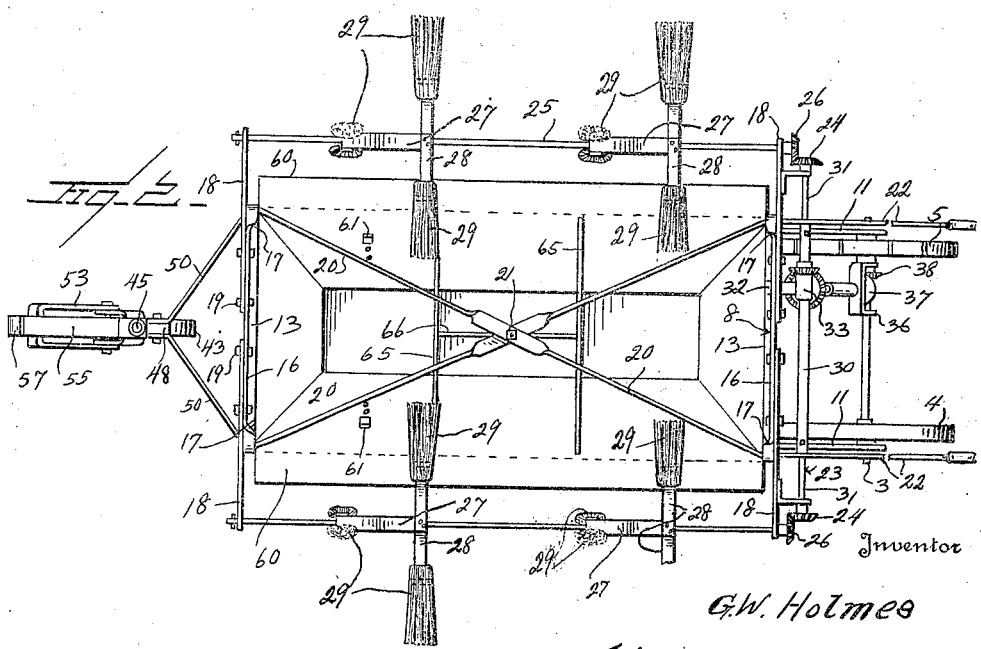
Inventor
G.W. Holmes
By Watson E. Coleman
Attorney Aug. 12, 1924.
G. W. HOLMES
1,504,474
BOLL WEEVIL GATHERER AND DESTROYER
Filed Oct. 23, 1922    2 Sheets-Sheet 2
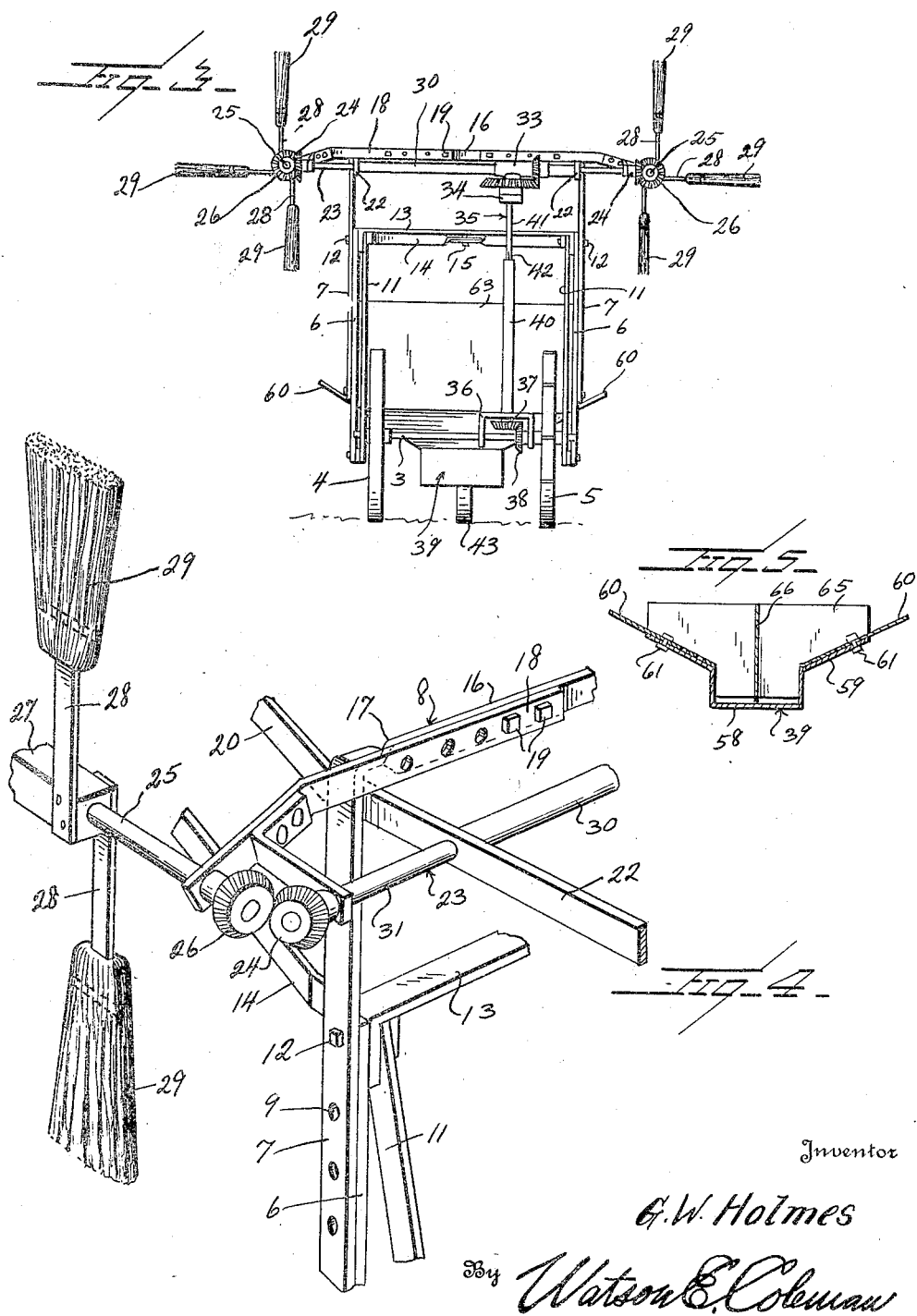
Inventor
G. W. Holmes
By Watson E. Coleman
Attorney Patented Aug. 12, 1924.

1,504,474

UNITED STATES PATENT OFFICE.

GETTE W. HOLMES, OF HOSSTON, LOUISIANA.

BOLL-WEEVIL GATHERER AND DESTROYER.

Application filed October 23, 1922. Serial No. 596,331.

*To all whom it may concern:*

Be it known that I, GETTE WRIGHT HOLMES, a citizen of the United States residing at Hosston, in the parish of Caddo and State of Louisiana, have invented certain new and useful Improvements in Boll-Weevil Gatherers and Destroyers, of which the following is a specification, reference being had to the accompanying drawings.

The present invention has for its purpose the provision of a machine of this character to be driven between the rows of cotton plants for gathering the boll weevils and other insects, and subsequently destroying them.

Another purpose is the provision of a machine of this kind including a frame provided with oppositely revolving members for knocking the boll weevils and other insects from the tops of the plants inwardly of the machine and into an insect pan which contains water and oil, the water constituting the greater portion of the body of the liquid, while the oil (which floats upon the upper surface of the water) constitutes the smaller portion of the liquid. The oil is to be of such character that it will kill the insects, which after floating upon the surface of the oil for a short while will eventually sink to the bottom of the pan.

Still another purpose is the provision of a frame for the support of the oppositely rotatable insect gathering members, said frame being adjustable laterally, so as to accommodate the members to rows of cotton plants differently spaced.

A further purpose is the provision of a pan for receiving the boll weevils and other insects, the pan having side extensions, which are also adjustable, to accommodate the machine to rows of plants differently spaced.

A still further purpose is the provision of means for permitting the upper part of the frame to be adjusted vertically, so as to accommodate the rotating brushes or members to cotton plants of different heights.

The invention also aims to provide means, so geared to a drive wheel of the machine and to the rotating brushes or members, as to rotate them very rapidly, at least at a speed twice or three times the speed of the drive wheel, so as to insure knocking the boll weevils and other insects from the tops of the plants.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in side elevation of the boll weevil gatherer and destroyer, showing the insect receiving pan and the rear part of the frame of the machine in section;

Figure 2 is a plan view of the same;

Figure 3 is a rear elevation;

Figure 4 is an enlarged detail view in perspective of one of the upper rear corners of the frame and a portion of the lower part of said corner and the shaft and one of the rotating brushes thereon, showing how the frame is adjustable and how the brush is operated;

Figure 5 is a cross sectional view through the insect receiving pan;

Referring to the drawings, 1 designates the bottom frame of the machine, and which comprises the longitudinal side bars 2. Arranged at the rear of the frame is a stationary shaft or axle 3 on which the wheels 4 and 5 are mounted. The wheel 4 rotates idly while the wheel 5 constitutes means for driving the rotating brushes, which are supported upon the frame of the machine.

Secured to and rising from the side bars 2 are relatively short uprights 6, to which the corner uprights 7 of the upper frame are adjustably connected. In fact the corner uprights 7 of the upper frame 8 are provided with a plurality of apertures or openings 9, for the reception of bolts 10, which pass through the relatively short uprights 6, thus providing means for adjustably supporting the upper frame, according to cotton plants of different heights.

Also rising from the rear stationary axle or shaft are braces 11, which are adjustably connected to the uprights 7 through the medium of bolts 12, which pass through certain of the apertures or openings 9. These braces 11 act to reinforce the frame relatively to the bottom frame and the rear axle or shaft, which is mounted in the lower ends of said braces 11.

The upper parts of the corner uprights 7 are reinforced by the transverse braces 13.

Furthermore the corner uprights 7 are reinforced by the diagonal braces 14, which are connected at 15 at their intersection.

It will be noted that the uprights 7 at their upper extremities are twisted or turned and merge into forward and rear transverse portions or bars 16. The uprights 7 and the bars 16 at the rear are all in one piece. The forward corresponding parts are likewise constructed. However, where the uprights 7 join the bars 16, twists as at 17 are formed, so as to cause the edges of the bars 16 to face upward.

Extension bars 18 are provided, there being a plurality of openings or apertures in the transverse bars 16 for the reception of bolts 19, which also pass through the extension bars 18, for adjustably connecting the latter to the bars 16. Obviously the extension bars 18 are adjusted laterally of the upper frame.

The upper parts of the uprights 7 where they merge into the transverse bars 16 are relatively reinforced by the diagonal braces 20, which are connected at 21 to their central portions where they intersect. It will be noted that the rear ends of the diagonal braces 20 are extended, thereby providing handles 22, by which the operator may push the machine forward.

Journaled in bearings of these extensions of the diagonal braces 20 is a transverse shaft 23, which is provided with beveled pinions 24 on its opposite ends.

Journaled in bearings of the extension bars 18 are longitudinally extending side shafts 25, the rear ends of which carry beveled pinions 26 meshing with the pinions 24. Also mounted upon and rotatable with the shafts 25 are the elongated hubs 27 of the rotating brushes. Secured to the hubs 27 are brush carrying blades 28, there being one at each end of each hub, one extending at right angles to the other. The bristles of the brushes extend radially and due to the blades revolving inwardly of the frame, that is to say, the lower portions of the blades operating inwardly under the shafts 25, the brushes will act to knock the boll weevils and other insects into the pan. The brushes 29 are relatively large and the bristles thereof long, so as to sweep against the tops of the cotton plants.

The rear shaft 23 comprises three sections, the central section 30 (which is tubular), and the end sections 31, which carry the beveled pinions 24. The end sections 31 telescope the central section 30, and are keyed to the central section so that the entire shaft will rotate as one body. The reason for making the shaft 23 in three sections, is to permit the shaft to be lengthened or shortened, according to the distance between the two shafts 25, in other words to accommodate the shaft 22 and its beveled pinions to the shaft 25 and its beveled pinions 26, whereby power may be transmitted to the shaft 25, regardless of the width of the frame.

An arm 32 is carried by and secured to the rear transverse portion 16 of the upper frame, and terminates in a bearing 33 through which the central section of the shaft 23 extends and is mounted. This arm 32 and the bearing 33 are in the form of a single casting. The bearing for the central section 30 of the shaft 23 has a bearing 34 for the shaft 35, which extends downwardly toward and is mounted in a bearing of the bracket 36, which also has a bearing for the axle or shaft 3. This bracket is supported upon the transverse portion of the bottom frame 1 at the rear thereof. The lower end of the shaft 35 has secured thereto a beveled pinion 37, which meshes with a beveled pinion 38 of one end of the hub of the drive wheel 5. Through the medium of these beveled gears 37 and 38 power is transmitted to the shaft 23 for the purpose of rotating the brushes downwardly and toward each other, for the purpose of sweeping the boll weevils and other insects into the receiving pan 39.

The shaft 35 comprises two sections 40 and 41, which are keyed or connected in any suitable manner as at 42 so that both sections may rotate as one body, to insure imparting motion to the shaft 23.

A single supporting wheel 43 is provided for the forward end of the machine, and in order to support this wheel a fourth frame 44 is provided. The reduced extension 45 at the upper end of the fourth frame 44 is mounted in a sleeve bearing 46. A collar 47 is secured by a set screw on the upper end of the extension 45 to hold the extension in the bearing sleeve. Projecting rearwardly of the bearing sleeve are arms 48 and 49, to which the upper and lower braces 50 and 51 are connected. The upper braces 50 diverge rearwardly and are connected to the forward uprights 7 at points where the diagonal braces 14 are connected to the uprights, while the lower braces 51 diverge rearwardly and downwardly and are connected at 52 to the lower or bottom frame. A loop bar 53 also straddles the forward wheel and has its lower ends provided with bearings for the reception of the axle 54 upon which the forward wheel is mounted. The loop bar is reinforced with respect to the reduced extension 45 by means of the brace 55. The upper end of this brace receives the extremity of the reduced extension 45, there being a nut on the extension to hold the brace connected thereto. The lower forward end of the brace 55 is secured to the arch of the loop bar 53 by means of a bolt and nut 56, and beyond the bolt and nut the brace bar 55 terminates in a hitch or hook 57, by which draft animals may be connected to the machine for drawing it along between the rows of cotton plants. When the machine is being drawn between the rows of cotton plants, the operator travels in the rear of the machine, grasping the handles 22, so as to more or less steady and drive the machine.

The boll weevil receiving pan is supported upon the lower frame 1, and comprises a longitudinally extending trough portion 58 and the laterally and upwardly diverging side pieces 59, which have extension members 60 held in different adjusted positions on the side pieces 59 by means of the bolts 61, which pass through the side pieces 59 and the extension pieces 60. In other words when the frame is adjusted laterally so as to accommodate it to rows which are spaced a considerable distance from each other, it is necessary to adjust the width of the insect receiving pan, which is accomplished by adjusting the extension pieces 60 considerably outwardly and upwardly, in order to insure catching and guiding the boll weevils and other insects into the pan. The pan is provided with forward and rear end fenders 62 and 63, which act to prevent the boll weevils and other insects from falling in advance of the pan or in the rear thereof. In fact the insects, when struck from the plants drop downwardly and to one side of the plants, and since the machine is moving, when the insects are so removed from the plants, the insects may drop forward of, or too much to the rear of the pan, instead of thereinto, if it were not for the forward and rear fenders, which act to guide the insects into the pan. The forward and rear fenders are secured at 64 to the uprights 7.

Rising from the bottom of the insect receiving pan are transverse abutments 65, which are reinforced by means of the longitudinal abutment 66.

It will be noted that the machine when being operated, is adapted to be drawn between the rows of cotton or other plants, the frame and other members having been adjusted to suit the distance between the rows, and as the machine is traveling, the rotating brushes engage with the tops of the plants and act to brush the boll weevil and other insects therefrom. Since the brushes rotate laterally outwardly and downwardly and under the shafts 25, the boll weevil and other insects are swept from the plants inwardly toward the center of the machine and therefore are deposited in the fluid, which comprises a maximum body of water and a minimum body of oil (which floats upon the water), the latter being destructive to the boll weevils and other insects, and when the insects are removed from the plants and caused to fall in the receiving pan, they will float for a short while on the surface of the oil until they are killed by the oil, after which they will descend to the bottom of the pan.

As previously stated the frame may be adjusted in height, as well as in width so as to accommodate the machine to plants of different heights and to rows differently spaced. Obviously when the frame is so adjusted, then it is necessary that the positions of the brushes be changed, therefore the parts of the frame which carry the shafts (which in turn support the brushes) are capable of being moved away from and toward each other.

The invention having been set forth, what is claimed is:—

An apparatus of the class described comprising a portable body, corner uprights carried by the body, frames substantially in the form of an inverted U coacting with the corner uprights at each end portion of the body, said frame extending upwardly of the corner uprights, means for connecting the side members of each of said frames with the associated uprights, arms associated with the upper portion of each of the frames and extending outwardly therefrom, means for adjustably connecting said arms to the frames, a shaft rotatably supported by each pair of arms at one side of the frame, driven means operatively supported by the frames for rotating said shafts, and brush elements carried by the shafts.

In testimony whereof I hereunto affix my signature.

GETTE W. HOLMES.